2,919,993

DISPERSING AGENTS FOR NON-AQUEOUS SYSTEMS

William J. Maxcy, Moorestown, N.J., assignor to General Aniline & Film Corporation, New York, N.Y., a corporation of Delaware No Drawing. Application December 31, 1956
Serial No. 631,502

5 Claims. (Cl. 106—19)

The invention here presented is a new composition of matter and a new procedure for dispersing solid pigments in organic substances, both solids and liquids, particularly pigments in solid carriers such as crayons, and in liquid carriers such as paints, lacquers and the like.

Many compositions of pigments in non-aqueous carriers have been made for many, many years, but without exception great difficulty is encountered in keeping the solid pigments dispersed in the carrier. The settling out of paint pigments from the vehicle during storage is well known to all painters, together with the difficulty of resuspending the pigment in the vehicle; similarly in the making of crayons, great difficulty is encountered in maintaining the dispersion and suspension of the pigment in the vehicle for a sufficient length of time to allow the vehicle to cool and solidify into a homogeneous pigmented solid. A wide range of dispersing and emulsifying substances which are highly efficient and effective in aqueous medium have been found and used but most of these substances are insoluble in organic carriers and practically all are substantially ineffective as dispersing, emulsifying and suspending agents; that is, the difference between aqueous media and non-aqueous media is such that the effectiveness of a given substance in an aqueous medium raises no assumption as to its utility in a non-aqueous medium.

According to the present invention it is now found that a compound of the type of N-cyclohexyl-N-palmitoyl taurate, having the formula:

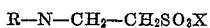
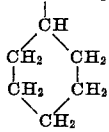

in which R may be any acyl group containing from 12 to 18 carbon atoms and X may be any alkali metal or ammonium ion including those formed from organic amines, is found to be highly effective as a dispersing and suspending agent for pigments and the like in non-aqueous solvents.

Thus this type of dispersing agent shows an outstanding dispersing power in organic substances such as the waxes, the various drying oils, various organic solvents and the like, to produce much more stable, uniform and smooth mixtures.

The organic liquid in this type of composition may be any organic liquid commonly used for given processes such as mixtures of paraffin and stearic acid for the manufacture of crayons, methyl ethyl ketone for the preparation of lacquers, mineral oil for the manufacture of typewriter ribbons, monomeric liquids intended for the preparation of polymers and acetone which is to be used in the soap dyeing of acetate rayon.

The solid particles of this composition may be any finely ground material, a dispersion of which is required in a manufacturing process. Thus, there would be included lakes, inorganic pigments, carbon black and filler materials of sufficiently fine particle size to be dispersible.

Thus the composition of matter of the present invention incorporates into a liquid or liquified organic carrier, a quantity of pigment or colorant and a dispersing agent, as above indicated, which retains its dispersing, suspending and emulsifying power in the organic liquid. Other objects and details of the invention will be apparent from the following description and examples.

*Example 1*

Nine parts of molten paraffin wax were melted in a test tube. One percent (based on the total weight of wax and barytes in the final mixture) of Antaron L-520, an approximately 20% active water slurry of N-palmitoyl-N-cyclohexyltaurate, sodium salt was added to the melt. Then, one part of barytes was added and stirred well. A similar sample was prepared which contained no dispersing agent. Eight minutes after agitating, although in each case a large portion of the barytes had settled in the former sample, the supernatant liquid was cloudy, whereas in the latter it was clear. A large number of other surfactants were tested on an equal weight basis. A competitive product, Nopcowet A, and also stearic acid and calcium stearate were as effective as the above agent. However, the examples to be cited below will show the superiority of the agent which is the subject of this proposal over these other dispersing agents. Although many other surfactants, including taurates, sarcosides and isethionates were slightly effective, none was equal to the subject agent.

*Example 2*

Nine parts of molten paraffin wax were melted in test tubes. To these portions were added the following percentages of dispersing agents (based on the total weight of blanc fixe and wax in the final mixture). The relative amounts of the two dispersing agents were calculated to be approximately equal:

A—None
B—1% of Turkey Red Oil
C—0.1% of Nopcowet A
D—2% of Sodium-N-cyclohexyl-N-palmitoyl taurate
E—0.2% of Sodium-N-cyclohexyl-N-palmitoyl taurate
F—0.4% of the residue obtained from a sample of sodium-N-cyclohexyl-N-palmitoyl taurate dried at 110° C.
G—0.04% of the residue obtained from a sample of sodium-N-cyclohexyl-N-palmitoyl taurate dried at 110° C.

Nopcowet A formed a clear solution in molten paraffin, Antaron L-520 formed a cloudy dispersion, and the dried residue obtained from Antaron L-520 formed a solution with a trace of insoluble materials.

To each of these tubes then was added one gram of blanc fixe and the samples were agitated to an equal degree.

Eight minutes after agitating, the blanc fixe in A had settled completely. That in C and D had almost completely settled, the supernatant liquid being slightly hazy. On E and G the supernatant liquid was still cloudy. In B, it was cloudier than in E and G. In F, no sediment was visible in the bottom of the tube, although slight clearing from the top could be seen. Thus, this agent in the dried form is more effective than Nopcowet A, a competitive product.

*Example 3*

Samples A and F of Example 2 were repeated using a molten mixture containing 60% paraffin wax and 40% stearic acid in place of 100% paraffin wax and barytes in place of blanc fixe. Eight minutes after agitating, the supernatant liquid in the tube containing the dispersing agent was visibly more cloudy than that containing only the wax-acid melt. Thus, although stearic acid of itself will disperse barytes, the addition of a small amount of the subject agent will improve such dispersions.

Example 4

Samples A, C, E and G of Example 2 were repeated using toluene at room temperature in place of the wax melt. A settled completely in eight minutes. C contained slightly hazy supernatant liquid above a sediment of blanc fixe. The supernatant liquid in E and G were cloudy.

Example 5

Example 4 was repeated using methyl ethyl ketone in place of toluene. In this case, after eight minutes there was still a slight haze in A, the blank sample. C was equal to A. The supernatant liquids in E and G were cloudy.

Example 6

A portion of the dried residue from Antaron L-520 was added to a test tube containing acetone. This was heated over steam for five minutes. The supernatant liquid was poured off and allowed to cool. An equal volume of acetone was added to a second test tube. Equal amounts of carbon black were added to each tube which then were shaken simultaneously and allowed to stand. The carbon black settled much more rapidly in the untreated acetone than in the treated solvent.

Thus the composition of matter of the invention produces markedly superior colored crayons and markedly superior waxy suspensions of all kinds, as well as outstandingly improved suspensions of paint, pigments and the like.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A composition of matter consisting essentially of a pigment dispersed in a suspending liquid selected from the group consisting of liquid waxes, stearic acid and drying oils, and, as the dispersing agent, anhydrous sodium-N-cyclohexyl-N-palmitoyl taurate.

2. A composition of matter consisting essentially of a pigment dispersed in a suspending liquid selected from the group consisting of liquid waxes, stearic acid and drying oils, and, as the dispersing agent, sodium-N-cyclohexyl-N-palmitoyl taurate previously made anhydrous by subjecting the same to a temperature of 110° C.

3. A composition of matter consisting essentially of a pigment dispersed in paraffin as the suspending vehicle and, as the dispersing agent, sodium-N-cyclohexyl-N-palmitoyl taurate in anhydrous form.

4. A composition of matter consisting essentially of a pigment suspended in a mixture of paraffin and stearic acid as the suspending vehicle and, as the dispersing agent, sodium-N-cyclohexyl-N-palmitoyl taurate in anhydrous form.

5. A composition of matter consisting essentially of a pigment dispersed in a drying oil as the suspending vehicle and, as the dispersing agent, sodium-N-cyclohexyl-N-palmitoyl taurate in anhydrous form.

References Cited in the file of this patent

McCutcheon: "Synthetic Detergents," Soap and Sanitary Chemicals, vol. 28, July 1952, pages 49 and 53; August 1952, page 60.

Ellis: "Printing Inks," pub. 1940 by Reinhold (page 327).

Ellis: "Printing Inks," pub. 1940 by Reinhold (page 207).

Fischer et al.: "Pigment Dispersion with Surface-Active Agents," Ind. and Eng. Chem., March 1943, pp. 336–342.

McCutcheon: "Synthetic Detergents," Soap and Sanitary Chemicals, July 1952, pp. 53, 60.